FIG. 3A.

United States Patent Office 2,982,818
Patented May 2, 1961

2,982,818

ELECTRONIC CODE RESPONSIVE SYSTEM

Hugh C. Kendall, Rochester, N.Y., assignor to General Railway Signal Company, Rochester, N.Y.

Filed May 24, 1957, Ser. No. 661,331

7 Claims. (Cl. 178—17.5)

This invention relates to an electronic code responsive system and more particularly pertains to means adapted to respond to and store certain preselected code characters in a received coded message.

This invention is contemplated to be particularly useful where a coded message is received and it is desired to extract from the message and then store in some storage or display means only certain portions of the message. Thus, the present invention may be used in a Teletype system of communication when certain preselected characters are to be extracted from an entire received message and stored or displayed in some appropriate associated means. The preselected characters may be designated as such by their being immediately preceded by one or more distinctive characters especially reserved for this purpose.

Thus, it is an object of this invention to provide electronic apparatus that will respond to the intermittent operation of a code receiving relay and will extract from the received coded information only the particular data that is intended to be extracted and will provide for the temporary storage of this data so that it may be transferred to a permanent storage medium for later use.

It is another object of this invention to provide electronic decoding apparatus that will respond to a serially received code message and will temporarily store only certain preselected digits for transferal to a permanent storage medium.

Other objects, purposes, and characteristic features of this invention will in part be obvious from the accompanying drawings and in part pointed out as the description of this invention progresses.

In describing this invention in detail, reference will be made to the accompanying drawings in which like reference characters designate corresponding parts in the several views and in which.

To simplify the illustration and facilitate in the explanation of this invention, the various parts and circuits are shown diagrammatically, and certain conventional illustrations have been used. The drawings have been made to make it easy to understand the principles and manner of operation rather than to illustrate the specific construction and arrangement of parts that would be used in practice. The various vacuum tubes employed are each assumed to be provided with a filament for the indirect heating of the associated cathode; however, such filaments are, of course, not provided for the various cold cathode tubes which are also included in the system. The symbols (B+) and (B—) indicate connections to the opposite terminals of a source of high voltage suitable for the operation of the various electron tubes, and the symbol for a ground connection indicates a common voltage level which is intermediate between the (B+) and (B—) voltage levels. In addition, the various relays and their contacts are illustrated in a conventional manner, and the symbols (+) and (—) represent the opposite terminals of a source of lower voltage suitable for the operation of electromagnetic relays.

Figure 1:
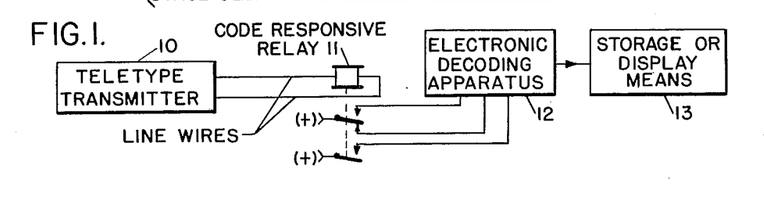
Fig. 1 illustrates in block diagram form one particular field of utility of the system of this invention.

Fig. 1 shows one way in which the electronic decoding apparatus of this invention may be used. Various information is transmitted by Teletype by a Teletype transmitter 10 to a receiving location which is provided with a code responsive relay 11. This relay has contacts which intermittently operate in accordance with the code, thereby providing input information for the electronic decoding apparatus 12. Out of all of the received information, the electronic decoding apparatus 12 extracts only the preselected coded characters and distinctively controls the display or storage means 13 accordingly.

As is well-known in the art, each Teletype code character is comprised of seven successive pulse periods, of which five are utilized for the transmission of a five bit code designating a respective character. Normally, the line wires connecting the transmitter to the receiver are in an energized condition, and the start of the five pulse periods of each character is indicated by the removal of this normal energization for a time equal to approximately one pulse period. Following these five pulse periods, the line is again energized to indicate the end of transmission of that particular coded character. On the five information bearing pulse periods, the line is selectively energized or deenergized to form a distinctive permutation of "mark" and "space" digits constituting a respective character.

At the receiving station, the individual pulse periods must be demarcated so that it will be possible to determine whether the line is energized or not on each of the various five pulse periods constituting the code character. This is accomplished by providing an independent timing means at the receiver which is organized to operate at the same rate as the corresponding timing means employed at the transmitter for demarcating the pulse periods of each transmitted character.

Actually, any particular five digit code represents not only one but two different characters, one being a so-called lower case or "letter" character and the other an upper case or "figure" character. A teleprinter is conditioned to print either the letter or figure character corresponding to a particular received code in accordance with whether the letter shift or figure shift function code was last transmitted. Other code permutations are assigned to other necessary functions of carriage return, line feed, and space.

In order that the preselected characters appearing in a printed line of the page printer will become distinctive in such a way that it will be recognized by the decoding apparatus as special information that is to be extracted and stored, it is necessary to precede this data by one or more preselected code characters. As particularly illustrated in the embodiment of the invention disclosed here, it is proposed that these distinctive characters be two successive occurrences of the figure shift code. Ordinarily, only a single figure shift character is transmitted when it is desired to transfer from lower case to upper case printing in the Teletype machine. Thus, the transmitting of two figure shift characters in succession provides a ready means for indicating that the immediately following characters should be extracted by the decoding apparatus. It will be apparent from the description of the detailed circuits later to be given that other combinations of characters may also be used to distinguish the information that is to be extracted and that this can even be accomplished by the transmission of a single character. However, in such instance this arangement would preclude the use of that particular character for any other use.

Figure 2:
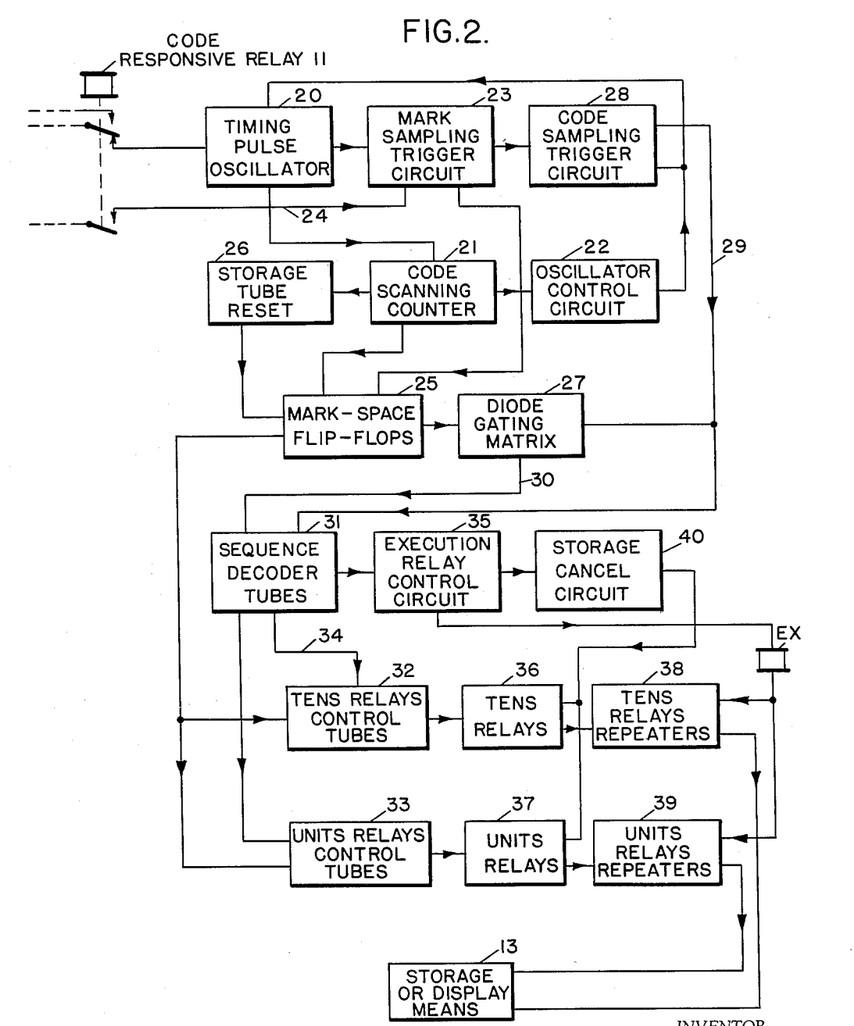
Fig. 2 illustrates in block diagram form the general organization of the electronic decoding apparatus of this invention.

Fig. 2 illustrates in block form the general organization of the decoding apparatus of this invention. The code responsive relay 11 is shown as supplying a controlling input to the timing pulse oscillator 20. It is the function of this oscillator to demarcate the successive pulse periods constituting each received code character. The output pulses of the timing pulse oscillator 20 are applied to the code scanning counter 21 which has a counting capacity corresponding to the total number of pulse periods in a received character so that it is constructed to count seven input pulses of the timing pulse oscillator 20 when the usual Teletype code is used. When the code scanning counter 21 has counted its capacity of counts, it supplies an output to the oscillator control circuit 22 which then controls the oscillator 20 to stop its operation. It can then be set into operation again only when the code responsive relay 11 is initially dropped away at the beginning of the next received character; its operation is not affected by the successive actuations of relay 11 that occur following its initial dropping away at the beginning of a received character.

The mark trigger circuit 23 receives an electrical input pulse for each output pulse of the timing pulse oscillator 20 and also receives an input control over lead 24 dependent upon whether the code responsive relay 11 is picked up or dropped away. On each of the pulse periods of a received code character, the code responsive relay 11 is picked up only if the digit is a "mark" digit. The mark sampling trigger circuit 23 is organized to provide an output trigger pulse in response to an input trigger pulse from oscillator 20 only when relay 11 is picked up by a "mark" pulse. The resulting mark trigger pulses are then applied to the mark-space flip-flops 25.

The mark-space flip-flops 25 comprise a plurality of electron tube bi-stable state devices or flip-flops as they are commonly known, with one being provided for each of the five digits in a Teletype character. Each time that the code scanning counter 21 is restored to its original condition to begin a new counting operation, it supplies an output to the storage tube reset 26 which then supplies an output to the flip-flops 25 to insure that they are all in a predetermined one of their two possible states.

As each character is being received, the flip-flops 25 are successively gated, one by one, as the counter 21 is stepped through a complete cycle. For example, during the first pulse period (i.e. period 2 of line A, Fig. 4) of each received character, the first flip-flop stage is conditioned or gated by the code scanning counter 21. Similarly, on each succeeding pulse period, the respective flip-flop stage is gated.

The flip-flops 25 also receive an input from the mark trigger circuit 23. This causes a trigger pulse to be applied to each of the flip-flops when a mark code digit is received on the corresponding pulse period. Only the particular flip-flop then being gated by the counter 21 can be operated from its normal or "zero" condition to the opposite or "one" condition and thus represent a mark digit. As a result, at the conclusion of a received character, the serially received code of marks and spaces constituting that character are displayed in parallel form in the flip-flop stages. For example, the received code constituting the digits mark-mark-space-space-mark, will cause the five successive flip-flop stages to be operated to the one-one-zero-zero-one conditions respectively.

It is necessary after each code character has been completely received and its five digits stored in parallel form in the mark-space flip-flops 25 that this code be examined to determine whether it is one of a number of preselected characters such as the ones which signify that the desired information to be extracted is about to be transmitted. It is for this reason that the diode gating matrix 27 is provided. This matrix 27 receives an input from the code sampling trigger circuit 28, which is organized to provide an output trigger pulse over lead 29 only at the conclusion of each received character when its five digits are stored in the respective flip-flop stages.

The diode gating matrix 27 is so organized with respect to the various flip-flop stages that it can provide an output pulse on lead 30 to the sequence decoder tubes 31 in response to the trigger pulse on wire 29 only for certain permutations of marks and spaces appearing in the flip-flops 25. For example, if it has been established that two successive occurrences of the figure shift character are to denote that the desired classification track number is to follow immediately, then the diode gating matrix 27 will provide an output on lead 30 each time that the permutation of the conditions of the flip-flops 25 indicates that such figure shift character is present. Under certain conditions, the sequence decoder tubes are directly actuated by the trigger pulse from the code sampling circuit 28, and this is shown by the direct connection of lead 29 to the sequence decoder tubes 31.

The sequence decoder tubes 31 selectively gate the tens relays control tubes 32 and the units relays control tubes 33 at appropriate times. Thus, a gating control is effective on lead 34 when it is determined that the tens digit is stored in the flip-flops 25, and this permits the control tubes to be selectively rendered conductive in a definite permutation determined by the particular character then stored in the flip-flops 25. The same situation applies to the units relays control tubes 33 as well.

Each control tube has a relay associated with it so that the relay picks up when the tube becomes conductive. Therefore, the selective firing of the tens relays control tubes in a particular permutation results in the selective picking up of the tens relays 36 in the same permutation. The relays 37 are similarly controlled by the units relays control tubes 33.

In one specifice embodiment of this invention, the desired information to be extracted comprises a two-digit number which is inserted in each successive line as it is printed on the page printer. Consequently, the desired information is always necessarily followed by the transmission of either the special carriage-return or line-feed characters. Because of this, the sequence decoder tubes 31 are organized to respond to the reception of either of these distinctive function characters so that when they are received, a distinctive control will be applied to the execution relay control circuit 35. This action results in the energization of an execution relay EX which then permits both the tens relays repeaters 38 and the units relays repeater 39 to be selectively energized, each one in accordance with the condition of its respective tens or units relay. Thus, the five relays provided for the tens relays repeaters 38 will be selectively picked up and dropped away in a particular coded permutation that corresponds exactly to the permutations of marks and spaces in the received code. The same applies with respect to the units relays repeaters 39.

The execution relay control circuit 35 also provides a pulse to the storage cancel circuit 40. As a result of this, the storage cancel circuit 40 after a predetermined interval supplies a distinctive output that acts through the energizing circuits of the tens relays 36 and units relays 37 to restore all the corresponding control tubes to their original nonconductive state so that these relays are immediately deenergized and thus able to respond again when more information is received at a later time for storing.

The supplying of the information temporarily stored in the tens relays repeaters 38 and units relays repeaters 39 to the storage or display means is also diagrammatically illustrated in this Fig. 2. Although this block diagram particularly illustrates only how two successive code characters occurring after a preselected combination of characters can be stored in some external storage medium, it will be readily understood that any number of such characters could be so stored and that the special signal that such characters are about to be received is in no way limited to the transmission of a double figure shift character but may be accomplished in any suitable manner as will be more apparent from the description of the detailed circuits that follows.

Figure 3A:
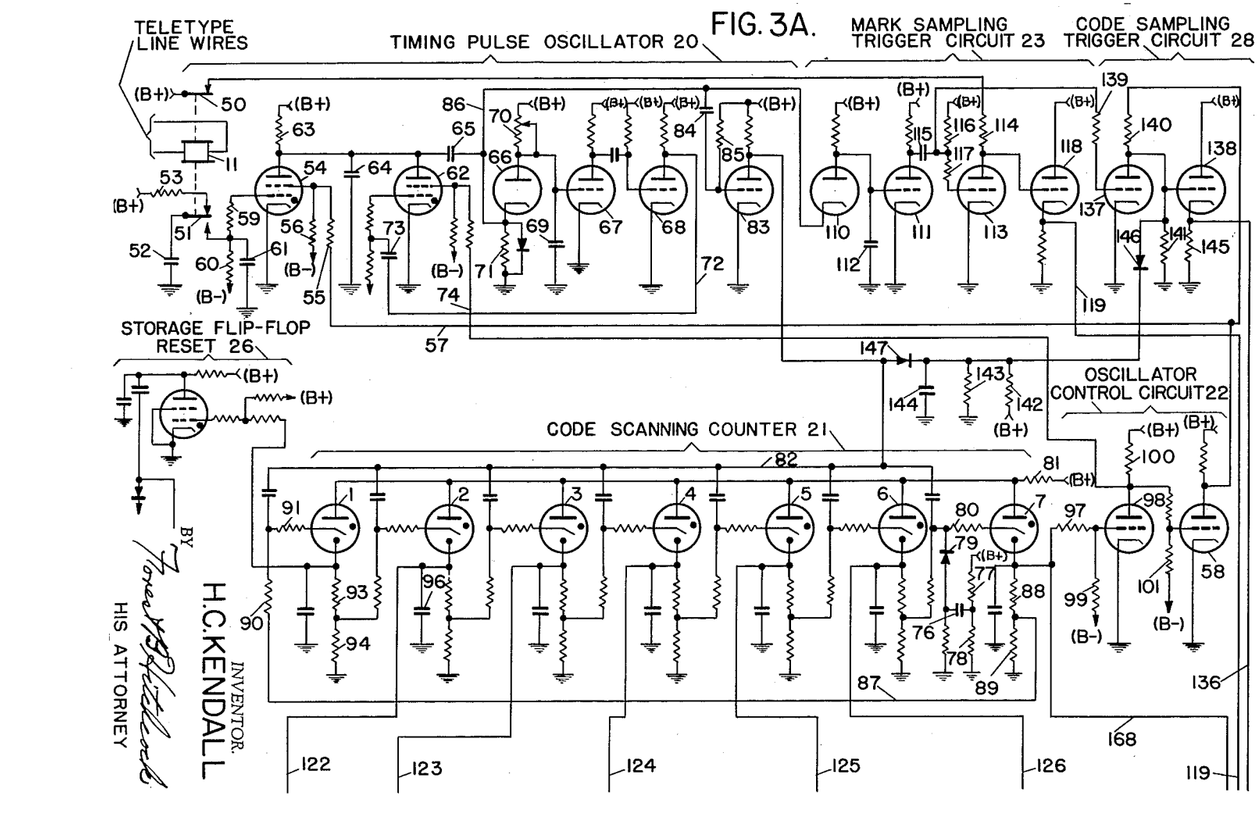
Figs. 3A, 3B, and 3C when placed in order, one above the other, illustrate the circuit organization of the present invention.
Figure 3B:
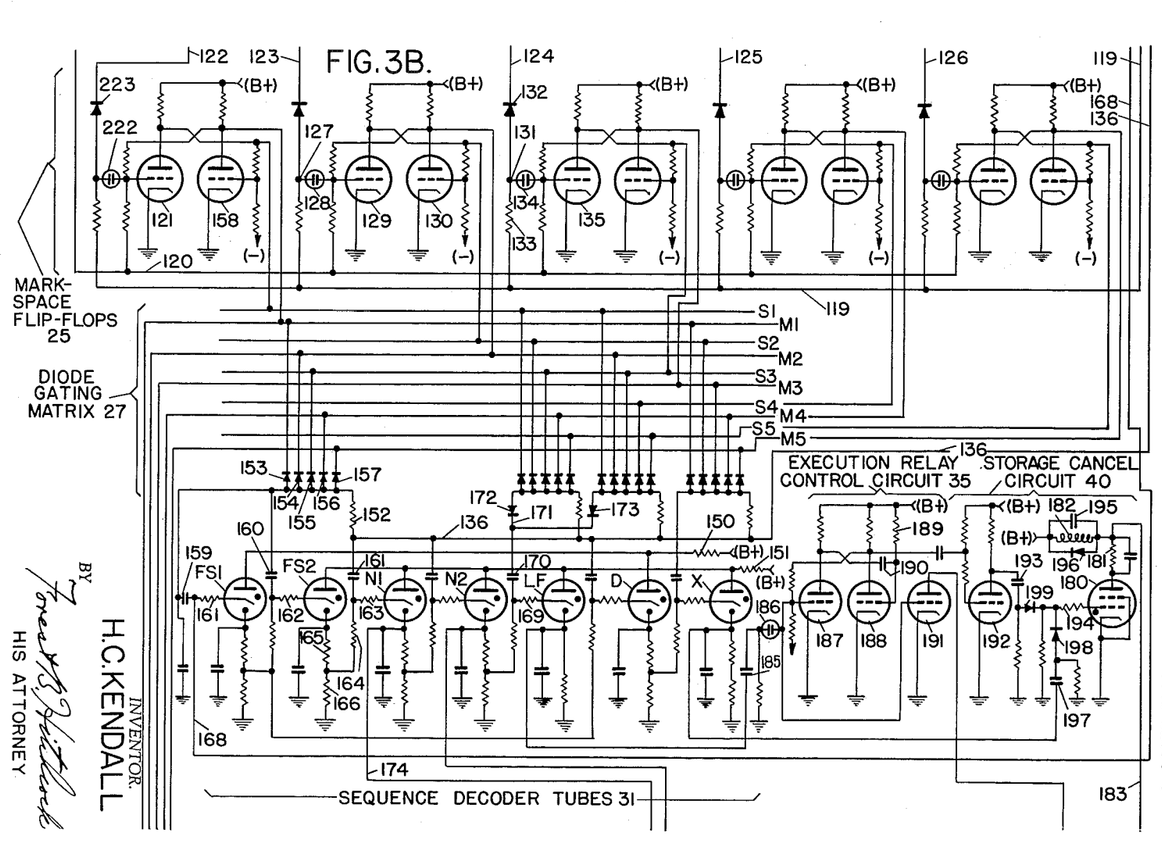
Figure 3C:
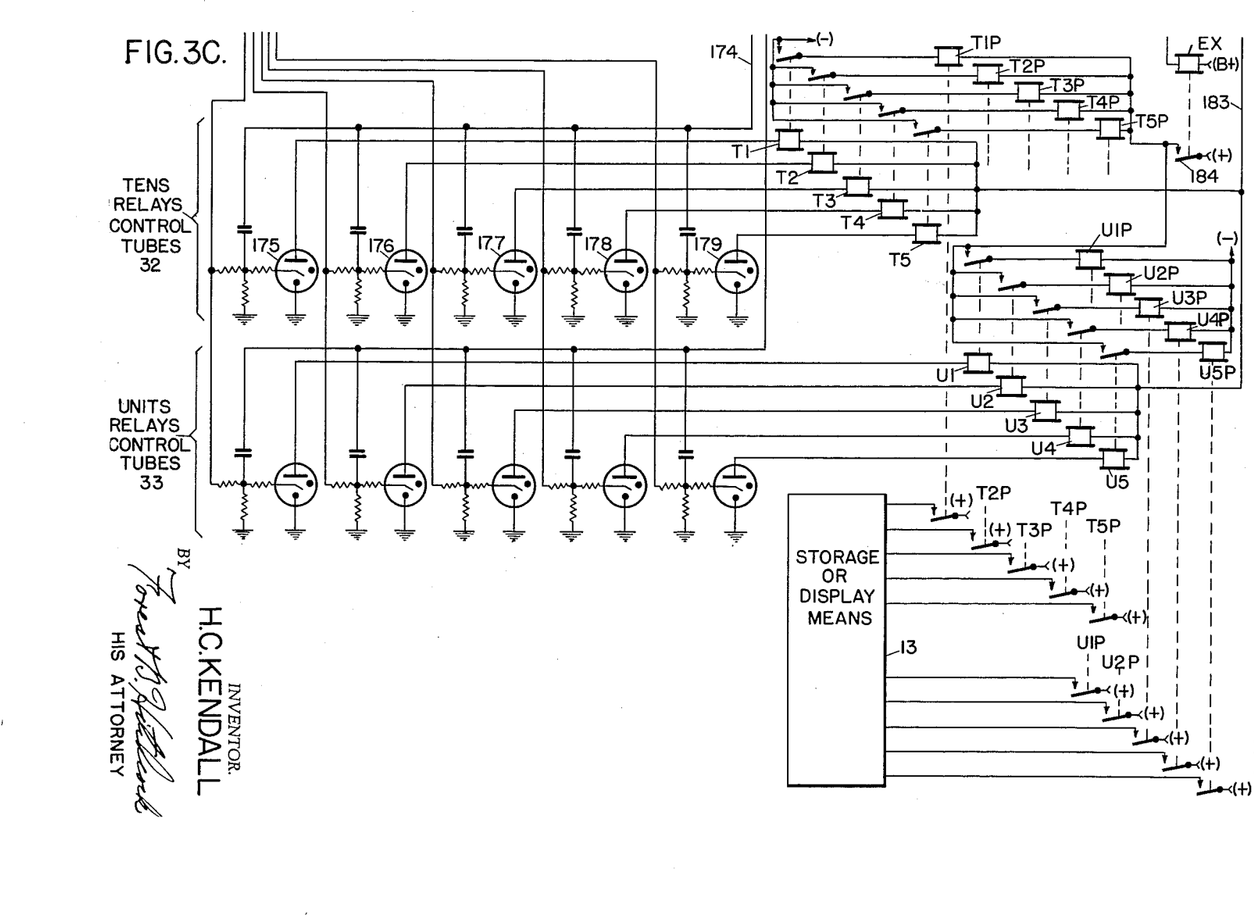

Referring to the detailed circuits of Figs 3A–3C, the code receiving relay 11 is shown as controlling the operation of both contacts 50 and 51. When contact 51 is in its normal picked-up condition, the capacitor 52, whose lower terminal is grounded, has its upper terminal connected through front contact 51 and through resistor 53 to (B+). The capacitor 52 is thus normally in a charged condition at the beginning of each Teletype code character.

As will presently be described, the initial dropping of relay 11 at the beginning of each received character results in the firing of gas discharge tube 54. This tube 54 has its shield grid connected to the junction of voltage dividing resistors 55 and 56. The lower terminal of resistor 55 is connected over wire 57 to the plate of tube 58. From the description to be given subsequently, it will be seen that this tube 58 is in the nonconductive state at the beginning of each Teletype code character so that its plate voltage is at a high level. Although the lower terminal of resistor 56 is connected to the (B−) terminal, the relatively high voltage appearing at this time on wire 57 results in a shield grid voltage for gas tube 54 that is equal to or slightly above ground potential so that this tube can be fired if its control grid potential is raised above the normal cutoff level. This normal cut off potential is obtained by the connection of the control grid through resistors 59 and 60 to (B−).

When relay 11 first drops away at the beginning of a newly received code character, the upper terminal of charged capacitor 52 is connected through back contact 51 to the junction of resistors 59 and 60. Resistor 60 is bypassed to ground by the capacitor 61 connected from the upper terminal of this resistor to ground, to prevent false triggers from firing tube 54.

The two gas discharge tubes 54 and 62 are connected in parallel and have a common plate resistor 63 and a common extinguishing capacitor 64 connected from their plates to ground. When both of these tubes are nonconductive, their plate voltage is substantially at the (B+) level so that capacitor 64 is charged to this high voltage. Upon the firing of either tube, the capacitor 64 abruptly discharges through the low resistance plate-cathode circuit of the conducting tube so that the capacitor is quickly discharged and the plate voltage is abruptly lowered. The plate resistor 63 is chosen to have such a large value of resistance that the maximum current through the conducting tube after the discharge of capacitor 64 is ordinarily not sufficient to sustain conduction. In addition, whatever inductance is present in the circuit as the result of the various connections made to the plate circuit cooperates with the capacitance provided by the extinguishing capacitor to produce an oscillatory voltage variation at the plate, thereby resulting in a momentary excursion of plate voltage sufficiently low with respect to the grounded cathode to result in the extinguishing of the fired tube. The result is, therefore, that the tube is quickly extinguished upon its being fired so that the normally high plate voltage which is abruptly reduced in value to near ground level when either tube is fired, rises exponentially after the tube is extinguished as a result of the charging of capacitor 64 through the large plate resistor 63.

The firing of either gas tube 54 or 62 causes the resulting negative-going plate voltage pulse to be applied through coupling capacitor 65 to the cathode of diode 66. This diode 66 together with the associated triode amplifier tube 67 comprise a delay circuit which produces a negative-going pulse at the plate of tube 67 at a predetermined time interval following the application of the negative-going input pulse to the cathode of diode 66. The function of the additional triode tube 68 is to provide an inversion of the negative-going pulse at the plate of tube 67 by providing a corresponding positive-going pulse at its plate.

Triode amplifier tube 67 has its control grid connected through capacitor 69 to ground and also through a portion of the potentiometer 70 to the (B+) terminal. This connection tends to raise the voltage at the grid of tube 67 above the potential of its cathode which is at ground. The result is that there is then a flow of grid current from the cathode of tube 67 to the control grid and then through the potentiometer 70 to the (B+) terminal. Because of the effectively low grid-cathode resistance of tube 67, the grid is able under these circumstances to assume a potential that is only very slightly positive with respect to ground.

The negative-going plate pulse provided by either gas tube 54 or gas tube 62 is supplied through coupling capacitor 65 to the cathode of diode 66 and causes this cathode voltage to go negative with respect to ground by an amount equal to the amplitude of the pulse. With the cathode driven negative with respect to the plate, diode 66 conducts with a resulting charging of capacitor 69 in the negative direction with the result that the grid voltage of tube 67 is driven considerably below cutoff. This negative charging of capacitor 69 occurs very rapidly. The result, therefore, is that the negative pulse at the cathode of diode 66 has charged capacitor 69 substantially negative and thereby driven tube 67 far beyond cutoff.

Upon the termination of the cathode pulse on diode 66, the capacitor 69 begins to charge exponentially toward the (B+) voltage to which its upper terminal is connected. It thus rises toward the cutoff voltage level of tube 67, and as it passes this point, tube 67 is abruptly made conductive so that its plate voltage, which was at a high level with this tube cutoff, is now abruptly lowered in value. The time interval required for tube 67 to become conductive after having been driven to cutoff by the negative pulse on the cathode of diode 66 is, of course, dependent upon the time constant for the discharging of capacitor 69. It is for this reason that the potentiometer 70 is provided in the plate circuit of diode 66, thereby enabling the time constant for the discharge to be readily adjusted as required.

The negative-going voltage variation at the plate of tube 67 is inverted, as previously described, by tube 68 so that a positive-going trigger pulse is applied over wire 72 and through the coupling capacitor 73 to the grid circuit of gas discharge tube 62. From the description of the oscillator control circuit 22 to be given subsequently it will be seen that the high voltage normally present on wire 57 just prior to the start of a newly received character is lowered after tube 54 has been fired in response to the initial dropping away of relay 11. The drop in voltage on wire 57 is accompanied by an increase in voltage on wire 74 so that the shield grid potential of tube 62 is sufficiently raised to permit this tube to fire in response to the positive-going trigger pulse appearing on wire 72.

The firing of tube 62 causes another negative-going trigger pulse to appear on the cathode of diode 66 so that the timing operation previously described is once more initiated. Upon the conclusion of the timing operation, another positive-going trigger pulse is applied to the grid of gas tube 62 so that it is fired once again. This operation occurs repeatedly, once for each pulse period of the received code character, until it is finally stopped by the oscillator control circuit 22 which causes the voltage on wire 74 to be lowered, thereby biasing the shield grid of tube 62 negative so that it can no longer fire in response to a positive pulse on its grid. The timing pulse oscillator 20 thus remains inactive until the code receiving relay 11 is again dropped away at the beginning of the next received code character.

From this description, it will also be clear that tube 54 cannot be fired by a dropping away of relay 11 occurring throughout the time of reception of a code character, i.e. after its initial dropping away at the beginning of such character. The reason for this is that the shield grid of tube 54 is negatively biased throughout such time while the shield grid of tube 62 is positively biased with the result that the positive-going triggers appearing on the control grid of tube 54 each time relay 11 drops away cannot cause the firing of this tube.

The code scanning counter 21 of Fig. 3A has a counting capacity of 7 counts, one for each of the pulse periods in a Teletype code character; therefore it includes seven cold cathode glow discharge tubes. Normally, the counter 21 is in the condition where the last tube 7 is conductive and the other tubes are nonconductive. When power is first applied to this system, the counter is assured of being put into this condition by reason of the positive-going trigger pulse that is applied to the starter of tube 7. Thus, the charging of capacitor 76 that occurs when voltage first appears across the voltage dividing resistors 77 and 78 connected from (B+) to ground causes a positive-going trigger pulse to be applied through diode 79 and through resistor 80 to the starter of tube 7.

Cold cathode tube counters of this type are generally well-known in the art so that a detailed description of the operation of the code scanning counter of this invention is deemed unnecessary. Described briefly, each tube of the counter has its plate connected through a common resistor 81 to the (B+) terminal. The starter of each tube is connected through a resistor and capacitor in series to a common bus 82 which is connected to the plate of triode tube 83. Each time that either gas discharge tube 54 or 62 is fired, the negative-going pulse that appears at the cathode of diode 66 is applied also through capacitor 84 to the control grid of the differentiator tube 83. This tube has its control grid connected through resistor 85 to the (B+) voltage terminal so that it is normally in a fully conductive condition. However, its control grid is prevented from rising in voltage appreciably above the grounded cathode because of the large voltage drop that results from the flow of a small amount of grid current through the very large resistance provided by resistor 85. Upon the leading edge of the negative-going trigger pulse appearing on wire 86, the control grid voltage of tube 83 is abruptly lowered considerably beyond cutoff so that tube 83 has its normally low plate voltage suddenly raised to substantially near the (B+) level. As capacitor 84 discharges, the voltage at the grid of tube 83 rises exponentially until the tube again becomes conductive with a resulting decrease of its plate potential. This differentiating amplifier thus operates in response to a negative-going input pulse on wire 86 by providing a corresponding positive-going trigger pulse at its plate.

Although the positive-going trigger pulses on bus 82 are applied through coupling capacitors to the starters of all the cold cathode tubes of the counter 21, only the particular tube that is then properly conditioned by having a positive biasing potential applied to its starter can be fired by the trigger pulse on bus 82. For example, when the counter is in the normal condition with tube 7 conductive, there is then a flow of current through the cathode resistance of this tube so that a positive voltage appears on wire 87 connected to the junction of resistors 88 and 89. This positive voltage is applied through resistors 90 and 91 to the starter of tube 1. Then upon the occurrence of a positive-going trigger pulse on bus 82, the starter of this tube is driven sufficiently positive with respect to the cathode to cause this tube to fire.

Once tube 1 has fired, the voltage at the junction of its cathode resistors 93 and 94 rises above ground, thereby providing a positive bias for the starter of tube 2. This tube 2 will thus be the one to fire upon the next occurrence of a positive-going trigger pulse on bus 82.

To obtain this manner of operation of the counter, it is necessary that the pulses on bus 82 be limited in amplitude so that a pulse cannot fire a cold cathode tube by itself, in the absence of the ordinarily required enabling bias voltage. For this reason, bus 82 is connected through rectifier 147 to the junction of voltage dividing resistors 142 and 143 connected in series from (B+) to ground. The relative values of resistors 142 and 143 are selected to cause the voltage at their junction to equal the maximum amplitude of pulse that is to appear on bus 82. The capacitor 144 shunting resistor 143 prevents this voltage from rising instintly. Thus, any attempt of bus 82 to rise in voltage above the desired maximum value causes blocking rectifier 147 to conduct and capacitor 144 to charge, thereby preventing the voltage from rising appreciably.

The firing of any tube of the counter results in the extinguishing of any other tube then in the conductive state. The reason for this is that the firing of any tube results in the flow of additional current through common plate resistor 81 so that the common plate voltage for the various counter tubes is abruptly lowered in value. The capacitor associated with the just-fired tube such as the capacitor 96 associated with tube 2 is then still in a substantially discharged condition so that the lowering of its plate voltage can be accompanied by a lowering in voltage of the cathode with the result that the plate-cathode potential will remain above the minimum value required to sustain conduction. With respect to any other counting tube, however, the cathode capacitor associated therewith will then be in a fully charged condition so that the cathode potential of such tube cannot be abruptly lowered as the plate voltage drops. The plate-cathode potential of such a tube will then be lowered below the sustaining value for a sufficient length of time to cause that tube to extinguish.

Figure 4:
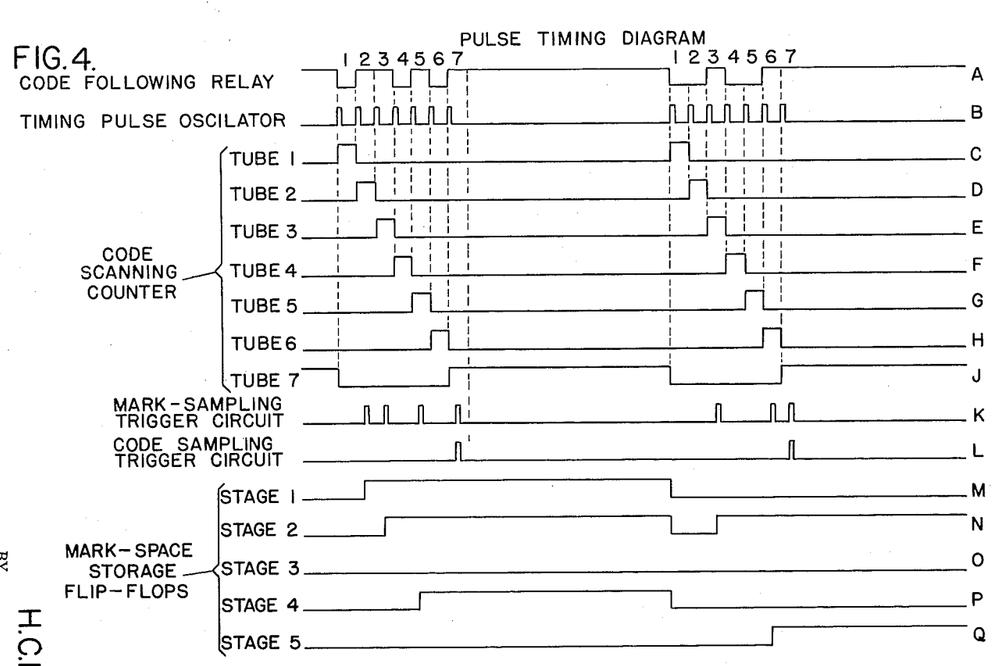
Fig. 4 comprises a pulse timing diagram which is provided as an aid in understanding the manner of operation of the present invention.

Fig. 4 illustrates by means of a pulse timing diagram the operation of the code scanning counter 21 in response to each received code character. Prior to the arrival of a new character it is shown that the last tube 7 of the counter is in a conductive state. Upon the initial dropping away of the code following relay 11, as shown at line A, a positive-going trigger pulse is produced by the timing pulse oscillator 20 as indicated at line B. As a result of this trigger pulse, the first counter tube 1 is fired since it is this tube which is conditioned to fire whenever tube 7 is in the conductive state. The successively occurring trigger pulses appearing on bus 82 and shown at line B of Fig. 4 as a result of the operation of the timing pulse oscillator 20 cause the successive tubes of the code scanning counter to be fired one at a time. At the beginning of the seventh pulse period, the counter is back in the condition where tube 7 is once more conductive. In this condition, the enabling bias for tube 62 is removed so that no further trigger pulses can appear on bus 82.

The manner in which the oscillator control circuit 22 has its operation governed by counter 21 will now be explained. Whenever counter 21 is in the normal condition with tube 7 conductive, the positive voltage appearing at the cathode of this tube is applied through resistor 97 to the control grid of tube 98 and thus tends to overcome the cutoff bias that this tube would ordinarily receive as a result of the connection of its control grid through resistor 99 to (B−). This causes tube 98 to be normally conductive so that the flow of its plate current through plate resistor 100 results in a relatively low voltage appearing on wire 74. As previously explained, this condition causes the shield grid potential of tube 62 in the timing pulse oscillator 20 to be negatively biased so that this tube cannot be fired. The low plate voltage of tube 98 is also ineffective to overcome the cutoff bias of tube 58 which this tube receives from the connection of its control grid through resistor 101 to (B−).

Tube 58 is therefore normally cut off so that a relatively high voltage appears on wire 57. This causes the shield grid potential of tube 54 to be sufficiently high so that this tube is properly conditioned to fire in response to the initial dropping away of relay 11 that occurs when a new teletype character is initiated.

During the reception of a Teletype character, however, tube 7 of the code scanning counter 21 is nonconductive; it is not again restored to the conductive state until the very end of the received character. During the time that tube 7 is nonconductive, its cathode is substantially at ground potential with the result that the relative conductive status of the two tubes 98 and 58 is reversed so that tube 98 is nonconductive and tube 58 is conductive. As a result, tube 54 in the timing pulse oscillator 20 has its shield grid negatively biased so that it cannot respond to the actuations of the code receiving relay 11; while tube 62, on the other hand, is properly biased so that it can respond to the positive trigger pulses that appear on wire 72. The timing pulse oscillator 20, therefore, continues to generate positive-going trigger pulses which appear on bus 82 when once set into operation by the initial firing of tube 54. This occurs until the code scanning counter 21 has gone through one complete cycle of operation and returns to the normal state where tube 7 is once more conductive. At such time, the timing pulse oscillator ceases its operation since tube 62 can no longer fire and is then restored to the state wherein it becomes responsive to the initial actuation of relay 11 occurring at the beginning of a code character.

The mark sampling trigger circuit 23 includes a delay circuit comprising diode 110 and triode amplifier tube 111 that operates in the same manner as the similar delay circuit included in the timing pulse oscillator 20 previously described. Each negative-going voltage variation appearing at the plate of either tube 54 or 62 initiates the timing operation by charging capacitor 112 negatively over wire 86 and diode 110 in a conductive condition thereby making tube 111 nonconductive. At the end of the delay interval when triode tube 111 again becomes conductive, an abrupt negative-going voltage variation appears at its plate which is then applied to the differentiating amplifier including triode tube 113.

This differentiating amplifier is similar to that comprising tube 83 and previously described. One difference is that the plate of tube 113 is connected through its plate load resistor 114 and to a front contact 50 of the code receiving relay 11 before being connected to the (B+) terminal. Consequently, the plate voltage of this tube can go positive toward the (B+) level each time its grid is driven negative from the plate of tube 111 only if relay 11 is then picked up in response to a mark digit so that the front contact 50 will be closed. Another distinction is that the right-hand terminal of capacitor 115 is connected to the junction of the two grid resistors 116 and 117. Since the voltage at this junction is normally above that of the grid when tube 113 is conductive, this means that the plate pulse of tube 111 must at least equal the voltage at this junction before the grid of tube 113 can be driven negatively. This ensures that spurious input pulses will not produce false output pulses at the plate of tube 113.

The over-all result is that the control grid of cathode follower tube 118 is driven positively toward (B+) at some predetermined interval following each pulse appearing on wire 86 but only if the code receiving relay 11 is then picked up in response to a mark digit. The amount of delay time provided by the mark sampling trigger 23 is such that the positive-going pulse on wire 119 for each received mark will occur shortly after the beginning of such digit. The delay time provided ensures that the pulse on wire 119 for each mark will not occur until any bouncing of the contacts of the code receiving relay immediately following its actuation has entirely subsided.

The trigger pulses produced on wire 119 are applied to the various stages of the mark-space flip-flops 25 shown in Fig. 3B. One stage comprising two interconnected tubes is provided for each digit in a code character; thus five stages are provided for the standard Teletype code. Each stage comprises what is well-known in the art as an Eccles-Jordan flip-flop trigger circuit. Each stage may be in either of two stable states, with one tube or the other fully conductive and the remaining tube fully cut off. Each tube has its plate connected to the grid of the opposite tube. Therefore, the low plate voltage of a conducting tube is effective to hold the opposite tube cut off while the high plate voltage of such cutoff tube maintains the other tube in a fully conductive state. The normal condition of each of the five flip-flops of Fig. 3B is that wherein the left-hand tube is nonconductive. This condition is reached through the effect of a negative-going trigger pulse that appears periodically on bus 120 and momentarily drives the grid of each left-hand tube to cut-off to ensure that all the stages are normally in this condition. The manner in which this resetting occurs through the action of the storage flip-flop reset 26 will later be described in detail.

The left-hand tube of each bi-stable state circuit has its control grid connected through a neon discharge tube and a rectifier to the cathode of a corresponding cold cathode tube in the code scanning counter 21. For example, the control grid of tube 121 of the first stage is connected through neon lamp 222, and rectifier 223 to the cathode of cold cathode tube 2. In addition, each left-hand tube has its control grid connected through its respective neon discharge tube and a resistor to bus 119.

As previously described, a positive-going trigger pulse appears on bus 119 for each occurrence of a mark digit in the received code. Although such a positive trigger pulse is applied to the left-hand tube of each stage, only the particular left-hand tube then being gated by its corresponding cold cathode tube of the code scanning counter can then be momentarily driven to conduction so that the flip-flop stage will be reversed. Described more specifically, the occurrence of a positive-going trigger pulse on bus 119 when cold cathode tube 3, for example, is conductive permits the voltage at the junction point 127 to rise appreciably above ground because of the above ground voltage then existing on wire 123. In fact, this voltage at the junction 127 rises sufficiently to ionize the neon lamp 128 so that the voltage on the grid of tube 129 can be driven above its cut-off level, and when this occurs, this flip-flop stage is driven to the condition where its tube 129 is fully conductive and tube 130 is fully cut off. On the other hand, cold cathode tube 4 is non-conductive at this time so that wire 124 is at ground potential. Therefore, a positive-going trigger pulse on bus 119 cannot result in an appreciable rise in voltage at junction 131 because any tendency for the voltage to rise at this point merely results in a substantial flow of current through rectifier 132 and through the cathode resistance of the non-conductive cold cathode tube 4. The resistance in the cathode circuit of this tube is sufficiently low with respect to the resistance of resistor 133 that the voltage at the junction 131 can rise only a very small amount, by no means large enough to permit the neon lamp 134 to ionize and thus drive the grid of tube 135 above cut off. In this manner, each trigger pulse on bus 119 is effective only on the particular flip-flop stage that is then conditioned by a corresponding conductive cold cathode tube included in the code scanning counter 21.

A comparison of the code scanning counter 21 with the mark-space flip-flops 25 indicates that there are seven cold cathode tubes in the code scanning counter 21 while there are only five flip-flop stages in the storage flip-flops 25. The reason for this is that there are two extra framing pulses provided for each received code character; one at the beginning and one at the end. Cold cathode tube 1 is conductive throughout the interval from the first dropping away of the code receiving relay 11 which indicates the beginning of the received character until the occurrence of the first code digit. The last cold cathode tube 7 is restored to its normal conductive state only at the beginning of the last or seventh pulse period. It is only the intervening five cold cathode tubes 2–6 which demarcate the corresponding five mark and space digits of each character. It is, therefore, necessary only that a flip-flop stage be provided for these five stages in order that each five digit character may be displayed in parallel.

From the description that has been given, it follows that, at the end of each received code character, the mark and space code constituting that character is displayed in parallel form in these flip-flop stages. For each mark received, the flip-flop- stage for the corresponding digit is operated to the condition where its left-hand tube is conductive and right-hand tube nonconductive. Similarly, for each space digit, the corresponding flip-flop stage remains in the normal state with its right-hand tube conductive and left-hand tube non-conductive because no pulse then appears on bus 119 for that stage is then gated from the corresponding counter tube. If the normal state of each flip-flop with the right-hand tube conductive is designated the "zero" state and the opposite condition is designated the "one" state, then a received character comprising mark-mark-space-space-mark digits, for example, will be displayed in the mark-space flip-flops 25 by having the successive stages respectively in the one-one-zero-zero-one states. This general mode of operation of the storage flip-flops is shown at lines M—Q of Fig. 4.

As each code character is received and stored momentarily in the storage flip-flops 25, its make-up is sampled to determine if it is one of a number of preselected characters such as a line feed or figure shift character. This is accomplished in part through the application of a pulse to bus 136 immediately upon the complete reception of each character. It is thus deemed expedient to describe at this time the manner in which this pulse is made to appear on bus 136.

The required pulse for bus 136 is generated in the code sampling trigger circuit 28 of Fig. 3A. This trigger circuit comprises the triode amplifier tube 137 and the cathode follower tube 138. The grid of tube 137 is connected through resistor 139 and differentiating capacitor 115 to the plate of tube 111 in the mark sampling trigger circuit 23. Consequently, at the end of each delay interval, as the grid of tube 111 rises above cut off, the negative-going plate voltage produces a negative-going trigger pulse on the grid of tube 137, thereby driving this grid beyond cut-off for an interval of time dependent upon the time constant for the discharging of capacitor 115 and its associated resistors.

The production of a plate pulse by tube 137 is, however, dependent not only upon obtaining a grid pulse from tube 111 but also on whether a suitable level of plate voltage is being provided for tube 137. Thus the plate of triode tube 137 is connected through plate load resistor 140 to the plate of tube 58 included in the oscillator control circuit 22. From the description previously given, it is clear that tube 58 is ordinarily cut off as long as the counter 21 is in the normal condition where its last counting tube 7 is conductive. It is only when this counter 21 is counting throughout the reception of a character so that one of the other tubes is conductive and tube 7 non-conductive, that triode tube 58 is in a conductive state.

The firing of tube 7 results from a pulse on bus 82, and this pulse is, in turn, produced by the last of a series of successive firings of gas discharge tube 62 occurring in response to the reception of a particular character. This last firing of tube 62 initiates a timing operation in the mark sampling trigger circuit 23 so that a negative-going voltage variation appears at the plate of tube 111 a brief time interval after tube 7 of counter 21 has fired. This again results in a positive trigger pulse on bus 119 since relay 11 is always energized during this last framing pulse period. This last trigger pulse does not, however, affect the flip-flops 25 because there is no stage of the flip-flops gated by tube 7 of the counter 21. However, the plate pulse of tube 111 is effective to drive the grid of tube 137 to cut-off and, since tube 7 is conductive at the time of this last pulse, tube 58 is also non-conductive so that a high voltage is supplied to the plate of tube 137. Thus, driving the grid to cut-off has the effect of providing a positive-going voltage variation at the plate of this tube.

The positive plate pulse of tube 137 results in a substantial rise in voltage on the grid of tube 138. Ordinarily this control grid is at a relatively low potential so that there is a corresponding low voltage produced across cathode resistor 145. However, the control grid is raised in potential appreciably at the end of each received character in the manner described above so that the voltage on wire 136 rises substantially above its normal value by reason of conduction through tube 138. The grid is connected through rectifier 146 to the junction of resistors 142 and 143, thereby preventing the grid pulse from rising above the voltage at the junction of these resistors. This prohibits the output pulse on bus 136 from rising to such a high level that it could erroneously fire one of the sequence decoder tubes 31 in the absence of the required enabling bias voltage.

It is the function of the sequence decoder tubes 31 to examine the code stored in parallel form in the mark-space flip-flops 25 each time that a character is indicated as being fully stored therein. In this way it is possible to respond distinctively to the reception of the particular character or combination of characters that presages the arrival of the information desired to be extracted. This is accomplished by providing a plurality of cold cathode tubes and controlling their selective firing by the diode gating matrix 27. Each firing of one of the cold cathode tubes is thus dependent upon the existence of a particular permutation of "zero" and "one" conditions of the storage flip-flops 25. In addition, the cold cathode tubes included in the sequence decoder tubes 31 can fire only in a particular sequence, thus ensuring that the distinctive characters are also received in a predetermined manner.

Of these various sequence decoder tubes 31, the tubes designated FS1 and D have a common anode circuit which includes the plate resistor 150. All of the remaining decoder tubes similarly have a common anode circuit including the plate resistor 151. In the same manner as described in connection with the code scanning counter 21, only one tube out of all those having a common plate circuit can be conductive at any one time. The reason for this is that the firing of any tube extinguishes any other tube then conductive because of the increased voltage drop across the common plate resistor.

At the conclusion of each received code character, a trigger pulse appears on bus 136 as already described. The diode gating matrix 27 provides a number of plural "and" gating circuits which permit this trigger pulse to appear on the starter of selected ones of the cold cathode sequence decoder tubes, but only if the storage flip-flops are storing certain selected code permutations.

The bus 136 on which this trigger pulse appears is connected through the various combinations of gating diodes to a plurality of buses, each of which is connected to a respective tube in the storage flip-flops 25. As an example, bus 136 is connected to a terminal of resistor 152; the other terminal of this resistor is connected through diode 153 to bus M1, through diode 154 to bus M2, through diode 155 to bus S3, through diode 156 to bus M4, and through diode 157 to bus M5. Each of these buses can be either at a high or a low potential depending upon whether the the associated tube in the storage flip-flops is non-conductive or conductive, respectively. For example, bus S1 can be at a high potential only if the first flip-flop stage is in the condition where its tube 121 is non-conductive, i.e. only if this first flip-flop stage is in the "zero" state indicating that the first stored digit is a space. At the same time, if this first stored digit is a space so that the right-hand tube 158 is conductive, then bus M1 is at a low potential. In a similar manner, either of the two buses associated with a particular storage flip-flop can be at a high potential, and the other bus must then be at a low potential. Of the two buses associated with any flip-flop stage, it is the space or "S" bus that will be at a high potential if that stage is in the "zero" state indicating that it is storing a space digit. Similarly, it is the mark or "M" bus that will be at a high potential if the corresponding flip-flop stage is in the "one" state, indicating that a mark digit is stored therein.

If a figure shift code is received, the successive storage flip-flops are respectively in their one-one-zero-one-one states since the figure shift character comprises the particular permutation of mark-mark-space-mark-mark digits. Therefore, with this character stored in the flip-flops 25, the buses that are at a high potential are those designated M1, M2, S3, M4, and M5, and it is thus only for this particular permutation that each of the diodes 153–157 will be connected to a bus that is at a high potential. Therefore, upon the occurrence of a trigger pulse on bus 136 at the end of the reception of the figure shift character there will be substantially no current flow through any of these diodes because of the equal potential across each terminal of each rectifier. There will then be no voltage drop across resistor 152 so that the full amplitude of such trigger pulse will be applied through the respective coupling capacitors 159 and 160 and respective resistors 161 and 162 to the starters of the two cold cathode tubes FS1 and FS2.

For any received code character other than the figure shift code, not all of the five buses designated above can be at a high potential. In that event, the trigger pulse on bus 136 will, in effect, be dissipated because there will then be a substantial current flow from bus 136 to any mark or space bus then at a low potential. This results in a large voltage drop across resistor 152 so that no positive-going pulse of sufficient amplitude can appear on the starters of either tubes FS1 or FS2. As an example, some other received code character might result in the first flip-flop stage being in the "zero" rather than the "one" state prescribed above for the figure shift character so that bus M1 cannot be at a high potential because of the conductive condition of tube 158. In that event, the abrupt rise in potential of bus 136 in response to the trigger pulse from the code sampling trigger circuit 28 would result in a substantial flow of current through resistor 152, through diode 153 to bus M1, and from bus M1 through the plate-cathode circuit of tube 158 to ground. This would produce a large voltage drop across resistor 152 so that only a very limited voltage pulse could then be applied to the starters of the two tubes FS1 and FS2.

Similar gating circuits are provided also for the cold cathode tubes LF and X. The various gating diodes associated with tube LF are appropriately connected to the various buses so that the positive trigger pulse on bus 136 can be applied to the starter of tube LF only if the mark-space permutation stored in the storage flip-flops 25 is then the particular one that occurs upon the reception of a line feed or carriage return character.

The same situation applies with respect to the application of the trigger pulse to the starter of the cold cathode tube X; the starter of this tube will have the trigger pulse applied to it only when the stored code is of the particular permutation designating the reception of the letter X.

The remaining cold cathode tubes N1, N2 and D have the trigger pulse on bus 136 applied directly through their respective coupling capacitors and resistors to their starters so that the starters of these tubes are driven positively at the end of each received character independently of the conditions of the various buses and thus independently of what particular character is then stored in the storage flip-flops 25. This pulse does not, by itself, result in the firing of these tubes, however, since the amplitude of this pulse on bus 136 is not sufficient to fire any of the cold cathode tubes in the absence of some other enabling positive bias. For example, the starter of tube N1 is connected through resistors 163 and 164 to the junction of the two cathode resistors 165 and 166 of tube FS2. When tube FS2 is non-conductive, the junction of its two cathode resistors 165 and 166 is at ground, and it is only when this tube is conductive that a positive voltage is present at this junction and is able to provide an enabling positive bias to the starter of tube N1. In the presence of such an enabling bias voltage tube N1 can fire when it additionally receives the positive trigger pulse from bus 136 through the coupling capacitor 167.

Similarly, the positive trigger pulse that appears on the starters of tubes FS1 and FS2 when a figure shift character is stored in the storage flip-flops 25, is also not sufficient to fire these tubes. The required enabling bias for tube FS1 is supplied to it over wire 168 from the cathode of tube 7 included in the code scanning counter 21 of Fig. 3A. As a result, whenever this counter is in its normal condition wire 168 is raised in potential so that tube FS1 can be fired if a figure shift character is received.

The firing of tube FS1 upon the reception of a figure shift character provides a positive bias not only to the starter of tube FS2 but also to the starter of tube D. Then if the next received character is also a figure shift character, it will be possible for tube FS2 to be fired and tube D as well. The firing of tube D will result in the extinguishing of tube FS1 because of the common plate resistor provided for these tubes.

The firing of tube FS2 by the second successive figure shift character provides a positive bias voltage for the starter of tube N1. The occurrence of the two successive figure shift characters is an indication that the immediately following character is the first of those that is to be extracted from the received information and stored. Thus, if the information that is to be extracted is a two-digit number, the biasing of the starter of tube N1 upon the firing of tube FS2 indicates that the next received character is the first or tens digit of the number to be extracted. Consequently, the next positive-going trigger pulse appearing on bus 136 and applied through capacitor 167 and resistor 163 to the starter of tube N1 will cause this tube to fire. The firing of tube N1 will then, in a manner similar to that described above, provide positive bias voltage for the starter of tube N2. Consequently, this tube N2 will be fired by the trigger pulse on bus 136 upon the reception of the second digit to be extracted.

Following the reception of the units digit of the desired number, either the line feed or carriage return characters will be received before a new line is started on the page printer. Accordingly, the cold cathode tube LF is provided, and this tube is fired upon the reception of either the line feed or carriage return characters. The firing of tube LF thus occurs at a time when both digits of the desired number have been received and stored in the respective tens and units relays in a manner to be described presently. The firing of this tube LF provides an input to the execution relay control circuit 35 that causes the actuation of an execution relay, permitting the desired number codes to be transferred in code form to respective repeater relays, after which the information is cancelled from the initial storage relays. The mode of operation of the execution relay control circuit 35 will subsequently be described in detail.

The starter of tube LF is provided with the enabling bias voltage when tube N2 is in the fired condition. The positive trigger pulse on the starter of tube LF is applied to it through resistor 169 and capacitor 170 from the wire 171. Two parallel diode matrices are provided; one of these is effective to provide the trigger pulse on wire 171 from bus 136 whenever the line feed permutation of marks and spaces is stored in the storage flip-flop 25, and the other is similarly effective to provide the trigger pulse on the starter when the special carriage return character is stored in the storage flip-flops 25. Therefore, the appearance of either of these characters when tube N2 is conductive, will permit tube LF to fire. It will be readily apparent from the description that has been given how this pulse gating function is provided. The only difference is that the two additional diodes 172 and 173 are provided to isolate the two separate gating matrices. Upon the firing of tube LF, the various sequence decoder tubes are again in their normal condition with tubes LF and D fired and all the rest extinguished.

An additional cold cathode tube, designated X, is included in the sequence decoder tubes 31. This tube can be fired by the reception of the letter X. If this occurs after the double figure shift code has been received but before the line feed or carriage return characters are received, the codes stored in the various relay control tubes are immediately cancelled. This makes it possible to effectively erase erroneously transmitted information and then subsequently transmit new information for extraction and storage.

Thus, gas tube X will have a positive-going trigger pulse applied to its starter whenever the letter X is received. This occurrence will result in the firing of tube X provided that tube D is then in a conductive condition and able to provide the enabling bias on the starter of tube X. From the description already given, it is evident that tube D is conductive at all times except after a single figure shift character has been received and which has caused tube FS1 to be fired. The firing of tube X will result in the extinguishing of any of the other cold cathode tubes also having the common plate resistor 151. Also, as will be shown, the cathode pulse provided at the cathode of tube X when it is fired provides an input to the storage cancel circuit 40 that will restore all of the various relay control tubes to the normal non-conductive state. As a result, the reception of an X makes it possible to cancel whatever characters are then stored, provided that tube LF has not yet been fired and thus caused the stored characters to be transferred from the various tens and units relays shown in Fig. 3 to the respective repeater relays.

To summarize the operation of the sequence decoder tubes, tube FS1 is conditioned to fire upon the complete reception of any character but will actually be fired only when the figure shift character is received. When tube FS1 has been fired, it conditions tube FS2 to fire. If the next character is also a figure shift character, tube FS2 will fire and condition tube N1 so that tube N1 can be fired when the next character is received regardless of what that character may be. At the same time, tube D will fire so as to extinguish tube FS1. However, if the next character is not another figure shift character, tube FS2 cannot fire but tube D will still fire so as to extinguish tube FS1 and thereby remove the enabling bias from the starter of tube FS2.

Assuming that two successive figure shift characters are received, the next two received characters will successively fire the tubes N1 and N2. As will be shown, the tens relays control tubes 32 will be selectively fired in accordance with the particular code stored in the flip-flops 25 upon the firing of tube N1. Similarly, the units relays control tubes 33 will be selectively fired in accordance with the code then stored in the flip-flops 25 upon the firing of tube N2. The next-following carriage return or line feed characters will result in the firing of tube LF and, as will be shown, this will result in the actuation of an execution relay EX and will also subsequently result in the restoration of the relay control tubes to their normal non-conductive conditions.

The tens relays control tubes 32 comprise five gas discharge tubes which are capable of storing and then transferring to the associated relays T1-T5 the particular tens digit of the two-digit numeral that is to be extracted from the received code. In a similar manner, the five cold cathode tubes included in the units relay control tubes 33 store the units digit of this two-digit number and permit the selective energization of the relays U1-U5 to store this numeral.

From the above description it is apparent that the firing of the cold cathode tube N1 is an indication that the mark-space flip-flops 25 are then storing the particular permutations of marks and spaces constituting the code for the desired tens digit. For this reason, a connection is made from the cathode of tube N1, over bus 174, through respective coupling capacitors to the starter circuits of all the cold cathode tubes included in the tens relays control tubes 32. The voltage rise that appears on bus 174 when tube N1 is fired has the effect of providing a positive-going trigger pulse on the starters of all these tubes. However, only those which are then also positively biased from one of the buses M1-M5 can then be fired. These buses M1-M5 are the respective mark buses shown in Fig. 3B and described in connection therewith. Each bus can be at a high potential only when the associated flip-flop stage of Fig. 3B is in the "one" state indicative of the fact that a mark digit was received on the corresponding pulse period of the code character. As an example, if the tens digit is the numeral 3, the successive flip-flop stages will be in the one-zero-zero-zero-zero- conditions, respectively. In other words, only bus M1 of the buses M1 to M5 will be at a high potential. Therefore, only tube 175 can be fired when the starter of this tube receives the positive-going trigger pulse from the cathode of tube N1.

Each of the relay control tubes has its plate connected through the winding of a respective relay to a common source of plate potential obtained from the plate circuit of tube 180 included in the storage cancel circuit 40 of Fig. 3B. As an example, tube 179 has its plate connected through the winding of relay T5 to the upper terminal of resistor 181 included in the plate circuit of tube 180. This tube 180 is normally nonconductive so that there is substantially no voltage drop across the inductor 182; therefore, substantially the full (B+) voltage is available on wire 183.

By the time that tube LF has been fired, both the tens relays control tubes 32 and the units relays control tubes 33 have been selectively fired according to the code representing the particular characters that are to be stored. As a result, both the tens relays T1-T5 and the units relays U1-U5 are selectively picked up in accordance with these particular codes. Relay EX, however, is dropped away so that the various repeater relays such as repeater relays T1P-T5P of the tens relays cannot be energized because of the open front contact 184. However, upon the firing of tube LF of the sequence decoder tubes 31, the execution relay control circuit 35 receives an input that causes the execution relay EX to be energized for a brief time so that these repeater relays can be selectively energized. When this has occurred, the storage cancel circuit 40 then receives an input that causes all of the then fired relay control tubes to be extinguished, thereby putting these tubes in condition to store the next two-digit number that will be received.

More specifically, upon the firing of tube LF, there is an abrupt increase of cathode potential of this tube which is applied through the coupling capacitor 185 and neon lamp 186 to the control grid of tube 187. This tube 187 together with the associated tube 188 form a conventional one-shot multivibrator. Tube 188 is normally conductive because its control grid is connected through resistor 189 to the (B+) terminal. However, the positive-going trigger pulse that the grid of tube 187 receives from the cathode of tube LF reverses the relative conductive status of the two tubes by causing tube 187 to become fully conductive and tube 188 non-conductive. This condition is maintained for an interval dependent upon the time constant for the discharge of the coupling capacitor 190 and associated resistor 189. When this capacitor has discharged sufficiently, the multivibrator is restored to the normal condition with tube 187 cut off.

When the multivibrator is in the normal condition with tube 187 cut off, the grid of this tube is at a substantially negative potential with respect to ground so that the triode amplifier tube 191 is also cut off. However, during the interval that tube 187 is conductive, its control grid potential is substantially at the level of the grounded cathode of this tube so that tube 191 can conduct and cause the relay EX in its plate circuit to pick up. The resultant closure of front contact 184 then permits the various repeater relays to be selectively energized.

The storage cancel circuit 40 includes the differentiating amplifier tube 192. This differentiator operates in a manner similar to that of tube 83 of Fig. 3A which has previously been described. Upon a negative-going voltage variation at the plate of tube 188, a positive-going trigger pulse appears at the plate of tube 192. Such negative-going voltage variation occurs upon the restoration of tube 188 to its normal, conductive state and thus occurs concurrently with the deenergization of relay EX. The trigger pulse is applied through the coupling capacitor 193, rectifier 199, and resistor 194 to the control grid of gas discharge tube 180 and causes this normally non-conductive tube to fire. The inductor 182 and capacitor 195 in the plate circuit of tube 180 react to the abrupt initiation of current in the plate circuit of this tube by causing the voltage at the upper terminal of resistor 181 to decrease abruptly to such a low value that conduction in the various relay control tubes energized from wire 183 cannot be sustained. Consequently, any of these tubes then in a conductive state and maintaining an associated relay energized is then restored to its normal non-conductive state so that the relay will drop away. The oscillatory voltage variation in the plate circuit of tube 180 also sufficiently reduces the plate potential of this tube to cause it to be extinguished. A shunting diode 196 is provided to insure that the voltage on wire 183 cannot, as a result of the oscillatory voltage variation, rise above the level of the (B+) source. This is done to prevent an erroneous firing of any of the relay control tubes since a cold cathode tube can be fired in the absence of the ordinarily required positive starter voltage if the plate voltage is at a sufficiently high level.

Tube 180 in the storage cancel circuit 40 also has its grid circuit provided with an input from the cathode of tube X in the sequence decoder tubes 31. This makes it possible for tube 180 to fire and render all the relay control tubes nonconductive if tube X is fired. As previously described this makes it possible for an operator to cancel erroneously transmitted information by transmitting the letter X. As long as this cancelling character is transmitted before tube LF has been fired by reception of either the line feed or carriage return characters, the erroneously transmitted information can be cancelled. If, however, tube LF has fired, then the information will already have been transferred to the various repeater relays as a result of the picking up of the execution relay EX. In that event, the information can no longer be cancelled in this manner.

The firing of tube 180 upon the firing of the sequence decoder tube X is accomplished in a manner that is obvious from Fig. 3B. Thus, the rise in cathode potential of tube X when this tube is fired is coupled through the coupling capacitor 197 and through rectifier 198 and resistor 194 to the grid of tube 180. The two rectifiers 198 and 199 isolate from each other the two individual input circuits to the grid of tube 180.

As shown in Fig. 3C, each of the repeater relays has a contact which selectively applies energy to the storage or display means 13. These contacts of the repeater relays are closed for a length of time that is dependent upon the interval that relay EX remains picked up, and this, in turn, is dependent upon the length of time that the multivibrator in the execution relay control circuit 35 remains in its abnormal state. In one specific embodiment of this invention, this time was selected to be approximately ½ second, thereby providing sufficient time for the code to be transferred from the repeater relays to the storage matrix before the repeater relays are released so that they may receive the next code.

Having described an electronic decoding system as one specific embodiment of this invention, I desire it to be understood that various adaptations, modifications, and alterations may be made to the specific form shown to meet the requirements of practice without in any manner departing from the spirit or scope of this invention.

What I claim is:

1. In a code communication system, receiving apparatus for responding to a randomly occurring succession of coded characters each comprising a distinctive permutation of a preselected number successive of mark-space digits of uniform duration, said receiving apparatus comprising registering circuit means including a plurality of bi-stable state stages one for each digit of a character, circuit means electrically connected operatively to said registering circuit means for selectively operating each of said stages from the normal condition in accordance with whether a mark is received on the respective digit of a character, sequence decoding means comprising a plurality of gas discharge tubes, gating circuit means electrically connected operatively to said bi-stable state stages and said sequence decoding means effective to fire a selected one of said tubes when said bi-stable state stages of said registering circuit means are in a preselected permutation of fired and non-fired conditions, circuit means including said selected tube and a second discharge tube of said sequence decoding means effective to cause said second tube to fire when said bi-stable state stages of said registering circuit means are in the same preselected permutation of fired and non-fired conditions for the next received code character then stored in said registering circuit means, and storage circuit means comprising another plurality of gas discharge tubes electrically connected operatively to said stages and said sequence decoding means, one of said other plurality of tubes being for each digit of a code character and each being respectively conditioned to be fired when its respective bi-stable storage stage of said registering means is operated from its normal condition and said second gas discharge tube of said sequence decoding means is in a fired condition.

2. In a system for receiving and registering a succession of randomly occurring coded characters each comprising a plurality of mark-space digits of respectively distinctive permutations occurring on successive pulse periods of uniform length, the combination comprising, electromagnetic circuit means being actuated from the normal condition in response to the initiation of each character, oscillatory circuit means electrically connected operatively to said electromagnetic circuit means and being put into operation by the initial actuation of said electromagnetic circuit means and effective to provide a series of output pulses at a rate corresponding to the rate of occurrences of said successive pulse periods, counting circuit means electrically connected operatively to said oscillatory circuit means and being operated from a normal condition to respectively different conditions in response to each of said output pulses to thereby demarcate the successive pulse periods of each character, circuit means governed by said counting circuit means for rendering said oscillatory means inoperative when all the successive pulse periods of a character have been demarcated, registering circuit means comprising a plurality of bi-stable state stages electrically connected operatively to said counting circuit means, one of said stages being for each mark-space digit of a coded character each being selectively conditioned in sucession by said counting circuit means, trigger circuit means electrically connecting said stages to said electromagnetic circuit means and said oscillatory circuit means for applying trigger pulses to all said bi-stable stages upon each occurrence of a mark digit, and means connecting said trigger circuit means and said counting circuit means to said stages operatively to cause said trigger pulses to be effective only for the particular stage then selectively conditioned by said counting circuit means to operate said stage to its opposite condition, whereby the serially received permutation of marks and spaces constituting each character is displayed in parallel form in said registering circuit means.

3. In an electronic teletype decoding system, registering means for displaying in parallel form each serially received mark-space coded character, sequence decoding means comprising a plurality of gas discharge tubes electrically connected to said registering means and operative to be selectively fired according to the code registered in said registering means, a first of said tubes being rendered conductive when a preselected coded character is registered in said registering means, a second of said discharge tubes being conditioned to be rendered conductive when the coded character immediately following said preselected character is the same preselected character and is registered in said registering means, storage circuit means including a first plurality of relays electrically connected to said registering means and said sequence decoding means operative to be selectively actuated according to the code stored in said registering means only when said second tube is conductive, repeater relay circuit means electrically connected operatively to said storage circuit means and comprising a second plurality of relays one for each of said first plurality of relays included in said storage circuit means, a third gas discharge tube of said plurality of tubes electrically connected to said registering means and said storage circuit means operative to be rendered conductive when a particular predetermined execution character is received and registered in said registering means following the storage of said preselected character in said storage means, and means connecting said third tube to said repeater relay circuit means effective upon the conducting of said third tube to cause the respective repeater relays to be each selectively actuated in accordance with the condition of its corresponding storage relay and also to restore all of said storage relays to their normal condition following the selective actuation of said repeater relays.

4. In a system for the communication of a succession of coded characters each comprising a plurality of mark-space digits from a transmitting location to a receiving location, circuit means at said receiving location comprising registering circuit means including a first plurality of bi-stable state devices one for each digit of a character, circuit means electrically connected operatively to said registering circuit means effective to selectively operate said first plurality of bi-stable state devices to respective positions to correspond to a selected permutation of marks and spaces upon the reception from the transmitting location of a succession of serially received mark-space code digits for a respective character, decoding circuit means electrically connected operatively to said registering circuit means effective to be controlled to a distinctive condition upon the operation of said bi-stable state devices to a preselected permutation of positions corresponding to a distant character, a second plurality of bi-stable state devices, one for each digit of a code character, circuit means electrically connecting said second plurality of bi-stable state devices to said registering circuit means and said decoding circuit means effective to operate said second plurality of bi-stable state devices to positions corresponding to the position of respective ones of said first plurality of bi-stable state devices when said decoding means is in said distinctive condition only.

5. In an electronic teletype decoding system, relay circuit means being selectively energized and deenergized in accordance with the distinctively coded marks and spaces appearing respectively on the successive pulse periods of each received character, oscillatory circuit means being set into operation at the beginning of each character, electronic code scanning means being operated step-by-step in response to said oscillatory circuit means to demarcate thereby the successive pulse periods of each received character, temporary code storage means comprising a plurality of bi-stable state stages one for each pulse period of a code character and being governed jointly by said scanning means and by said relay means to distinctively control each stage to one state or the other in accordance with whether a mark or space is received on the corresponding pulse period to thereby provide a temporary parallel storage of the serially received mark-space code constituting each received character, code registering means also comprising a plurality of bi-stable stages one for each pulse period and each being distinctively operated according with whether a mark or space is received on the corresponding pulse period as detected by said relay means only provided that said code registering means is distinctively gated, gating circuit means governed by said temporary code storage means for gating said code registering means to be responsive to a received code character only when a particular preselected code character has been temporarily stored in said temporary storage means as the immediately preceding code character, and output circuit means being distinctively controlled in accordance with the particular code stored in said code registering means.

6. In a teletype code receiving organization, code registering means comprising, a code receiving relay being selectively actuated according to the distinctive permutations of marks and spaces occurring on successive pulse periods of the successive digits comprising each character but being always actuated upon the start of each character to demarcate thereby the beginning of said character, oscillatory circuit means including two gas discharge tubes and associated extinguishing means for restoring to the nonconductive condition either tube immediately following its being fired, said oscillatory circuit means also including a delay means being set into operation upon the firing of either of said tubes and effective to produce an output pulse delayed with respect to the firing of said tube setting said delay into operation by an amount equal to the duration of each code digit, counting circuit means governed by the successive firing of either of said tubes and being operated thereby from a normal at rest condition through a plurality of distinctive states corresponding to the number of pulse periods of each character before being restored to its normal condition, means effective when said counting means is in its at rest condition for firing the first of said gas discharge tubes upon the initial actuation of said relay, means effective only when said counting means is not at its at rest condition for firing the second of said tubes in response to the output pulses provided by said delay means, and registering means comprising a bi-stable state for each digit stage of a character being governed jointly by said counting means and by said code receiving relays to selectively control said stages from their normal condition to the opposite condition in accordance with whether said relay is picked up or dropped away on the respective digit of the received coded character, whereby the serially received mark-space code of each character is caused to be registered in parallel form in said registering means.

7. In a code communication system, receiving apparatus for responding to a randomly occurring succession of coded characters each comprising a distinctive permutation of a preselected number of mark-space digits of uniform duration, registering means including a plurality of bi-stable state means one for each digit of a coded character, means for causing the successive bi-stable state means to be selectively operated from their normal to their opposite conditions according to whether the respective digit of the character is a mark rather than a space digit, sequence decoding means comprising a series of gas discharge tubes each after the first capable of being fired only if the preceding tube is in a conductive condition, the first of said tubes being fired only when a coded character having a particular preselected permutation of marks and spaces is registered in said registering means, the second of said tubes being fired when conditioned by the fired condition of the first tube only if the next coded character registered in said registering means also has said particular permutations of marks and spaces, circuit means effective when said first tube is conductive to extinguish said first tube upon the reception of the next coded character, a third gas discharge tube being rendered conductive by the registering of a character in said registering means when said second tube is conductive, and storage circuit means being rendered effective when said third tube is conductive to store the mark-space permutation of digits registered in said registering means when said third tube is conductive, whereby the precedence of a particular character by a double occurrence of said character having said particular permutation results in the storage of said character in said storage circuit means.

References Cited in the file of this patent
UNITED STATES PATENTS 2,708,267    Weidenhammer _________ May 10, 1955